United States Patent
Dhesi et al.

(10) Patent No.: US 8,555,336 B1
(45) Date of Patent: Oct. 8, 2013

(54) SYSTEM, METHOD, AND COMPUTER PROGRAM PRODUCT FOR A PRE-DEACTIVATION GRACE PERIOD

(75) Inventors: Rajkaran Singh Dhesi, Worthing (GB); Simon Hunt, Naples, FL (US); Paul Martin Parke, Brighton (GB)

(73) Assignee: McAfee, Inc., Santa Clara, CA (US)

( * ) Notice: Subject to any disclaimer, the term of this patent is extended or adjusted under 35 U.S.C. 154(b) by 752 days.

(21) Appl. No.: 12/056,907

(22) Filed: Mar. 27, 2008

(51) Int. Cl.
*H04L 29/06* (2006.01)

(52) U.S. Cl.
USPC ...... 726/2; 726/26; 726/27; 726/34; 455/410; 455/411; 455/26.1

(58) Field of Classification Search
USPC ............. 713/1, 100, 158, 166, 182, 183, 189, 713/193; 726/2, 4, 5, 7, 17, 19, 26, 27, 28, 726/34, 35; 455/410, 411, 26.1; 380/247, 380/270, 273
See application file for complete search history.

(56) References Cited

U.S. PATENT DOCUMENTS

| | | | | |
|---|---|---|---|---|
| 6,360,326 | B1 * | 3/2002 | Hiles | 726/19 |
| 7,159,120 | B2 * | 1/2007 | Muratov et al. | 713/182 |
| 7,603,105 | B2 * | 10/2009 | Bocking et al. | 455/411 |
| 2003/0065934 | A1 * | 4/2003 | Angelo et al. | 713/200 |
| 2004/0049586 | A1 * | 3/2004 | Ocepek et al. | 709/229 |
| 2005/0226468 | A1 * | 10/2005 | Deshpande et al. | 382/115 |
| 2006/0021007 | A1 * | 1/2006 | Rensin et al. | 726/2 |
| 2006/0274683 | A1 * | 12/2006 | Koch et al. | 370/310.2 |
| 2008/0046753 | A1 * | 2/2008 | Fusari | 713/186 |
| 2008/0104409 | A1 * | 5/2008 | Matsuoka et al. | 713/178 |
| 2008/0120716 | A1 * | 5/2008 | Hall et al. | 726/16 |
| 2008/0184035 | A1 * | 7/2008 | Iyer et al. | 713/183 |
| 2009/0227232 | A1 * | 9/2009 | Matas et al. | 455/411 |

FOREIGN PATENT DOCUMENTS

JP     2006211007 A  *  8/2006

OTHER PUBLICATIONS

Machine translation of Japanese Patent Application Publication No. 2006-211007.*
Dotnetspider.com Tutorial, "Using Cookies to remember user settings", 2006, available at <http://web.archive.org/web/20060721230844/http://www.dotnetspider.com/tutorials/AspNet-Tutorial-90.aspx>.*
U.S. Appl. No. 12/056,837, filed Mar. 27, 2008.
U.S. Appl. No. 12/056,869, filed Mar. 27, 2008.
U.S. Appl. No. 12/056,931, filed Mar. 27, 2008.

* cited by examiner

*Primary Examiner* — Eleni Shiferaw
*Assistant Examiner* — Hilary Branske
(74) *Attorney, Agent, or Firm* — Wong, Cabello, Lutsch, Rutherford & Brucculeri, LLP

(57) ABSTRACT

A system, method, and computer program product are provided for a pre-deactivation grace period. In operation, a deactivation request is detected for a deactivation event. Further, the commencement of the deactivation event is delayed for a predetermined time period, in response to the deactivation request. Additionally, the deactivation event is commenced, after the predetermined time period.

22 Claims, 10 Drawing Sheets

SYSTEM, METHOD, AND COMPUTER PROGRAM PRODUCT FOR A PRE-DEACTIVATION GRACE PERIOD

FIELD OF THE INVENTION

The present invention relates to information security, and more particularly to information security on mobile devices.

BACKGROUND

Mobile devices such as personal digital assistants (PDAs) and Smartphones are now often being used as a replacement for personal computers (PCs) and notebook PCs in many organizations. In many cases, sensitive information associated with the organization (e.g. files, folders, etc.) may be stored on these devices. Additionally, because mobile devices often have the ability to connect to network resources intermittently, monitoring the devices, corresponding software, and stored data is a daunting security management task.

Mobile devices by nature are small, easily misplaced, and are attractive to criminal elements looking for sensitive information on unprotected machines. Thus, sensitive business information and real documents are now at risk and the threats that need to be addressed with these converged devices are nearly equivalent to those of the PC. However, mobile devices often offer separate and additional functionality not found on PCs that should also be considered when addressing information security issues.

There is thus a need for overcoming these and/or other issues associated with the prior art.

SUMMARY

A system, method, and computer program product are provided for a pre-deactivation grace period. In operation, a deactivation request is detected for a deactivation event. Further, the commencement of the deactivation event is delayed for a predetermined time period, in response to the deactivation request. Additionally, the deactivation event is commenced, after the predetermined time period.

DETAILED DESCRIPTION

Figure 1:
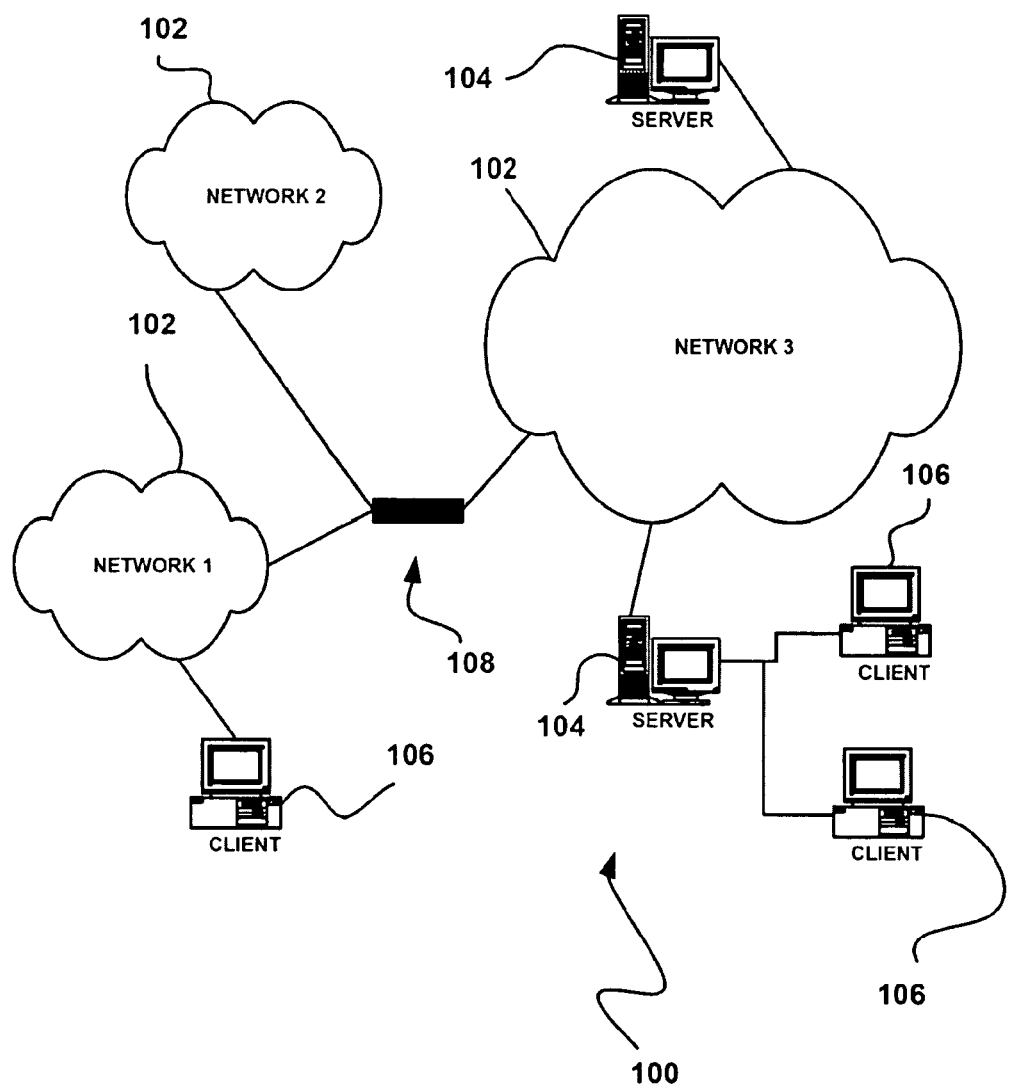
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
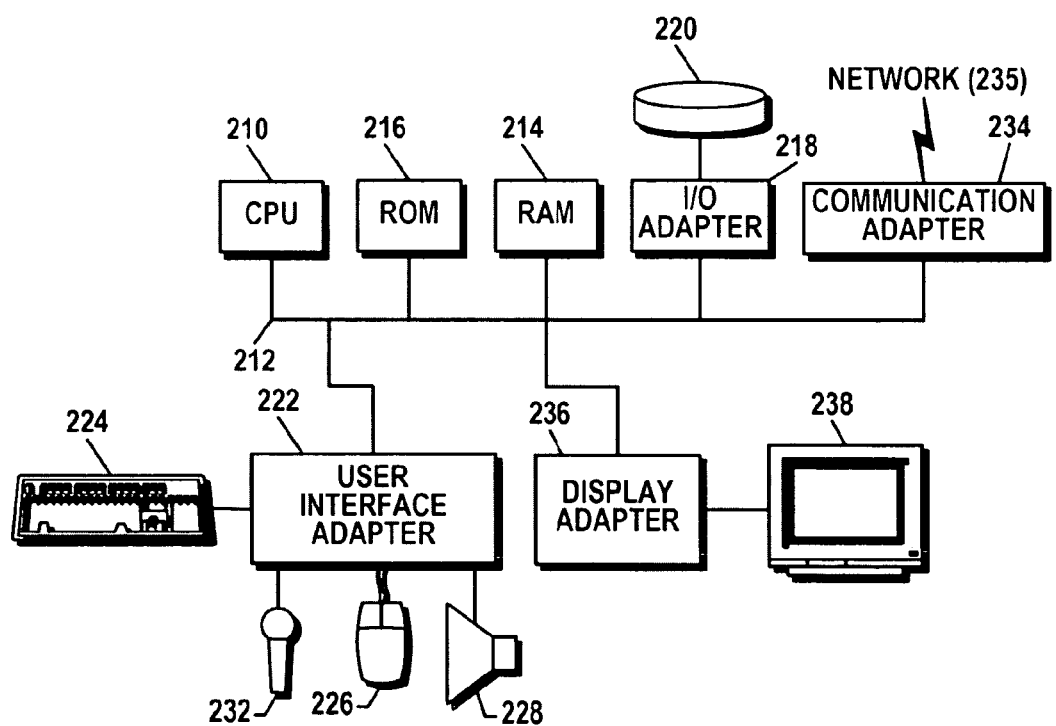
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 (e.g., program storage devices) to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
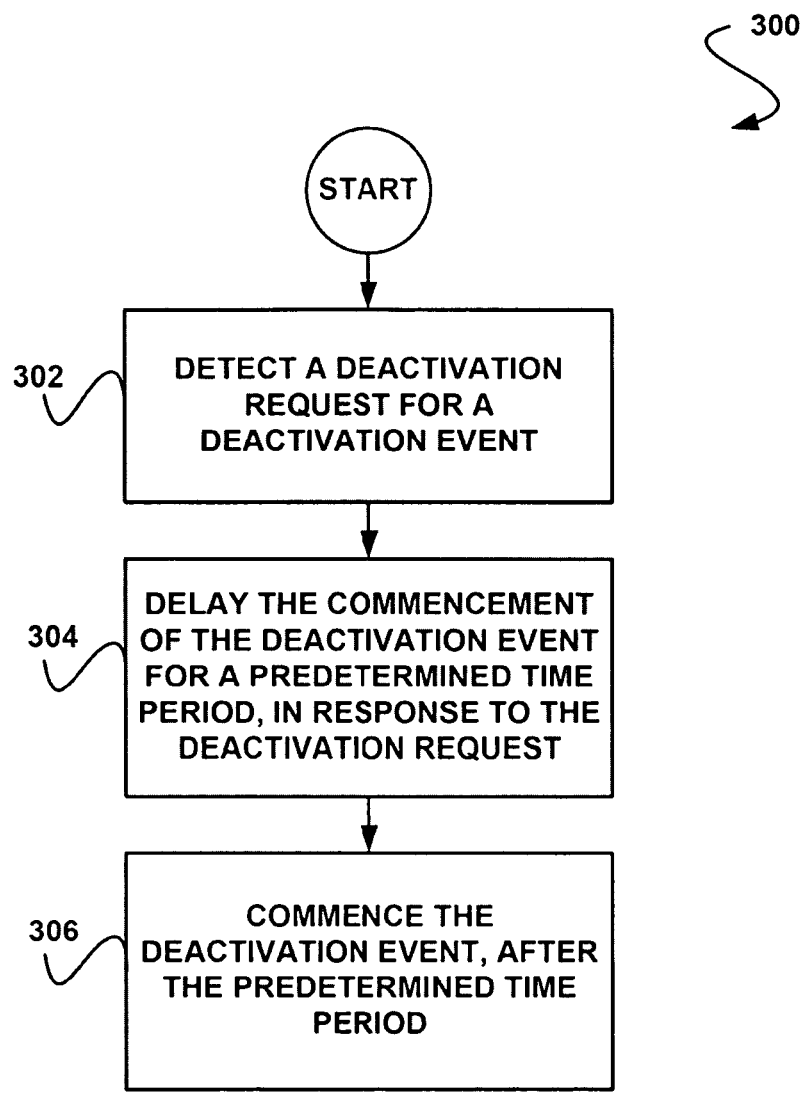
FIG. 3 shows a method for a pre-deactivation grace period, in accordance with one embodiment.

FIG. 3 shows a method 300 for a pre-deactivation grace period, in accordance with one embodiment. As an option, the method 300 may be implemented in the context of the architecture and environment of FIGS. 1 and/or 2. Of course, however, the method 300 may be carried out in any desired environment.

In operation, a deactivation request is detected for a deactivation event. See operation 302. In the context of the present description, a deactivation event refers to any event associated with a deactivation process. For example, in various embodiments, the deactivation event may include, but is not limited to, a power-down, a mode change (e.g. active to standby mode, etc.), a sleep mode, a reset, and/or any other deactivation event that meets the above definition.

In this case, a deactivation request refers to any request corresponding to the initiation of a deactivation event. In various embodiments, the deactivation request may include a request from a user, a request from a device, a remote request, a local request, a timeout, and any other manual or automatic request.

Further, the commencement of the deactivation event is delayed for a predetermined time period, in response to the deactivation request. See operation 304. The predetermined time period may be any predetermined time period. In one embodiment, the predetermined time period may be fixed. In another embodiment, the predetermined time period may be configurable.

Additionally, the deactivation event is commenced, after the predetermined time period. See operation 306. It should be noted that, partial or full functionality may be available while the commencement of the deactivation event is delayed.

As an option, the detecting, delaying, and the commencing may be carried out utilizing a mobile device. In this case, a device refers to any device capable of being accessed by a user. For example, in various embodiments, the device may include, but is not limited to, a mobile phone, a PDA, a handheld computer, and/or any other device that meets the above definition. In one embodiment, the mobile device may include security computer code for encrypting memory on the mobile device. In this case, the security computer code may perform the detecting, the delaying, and the commencing.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
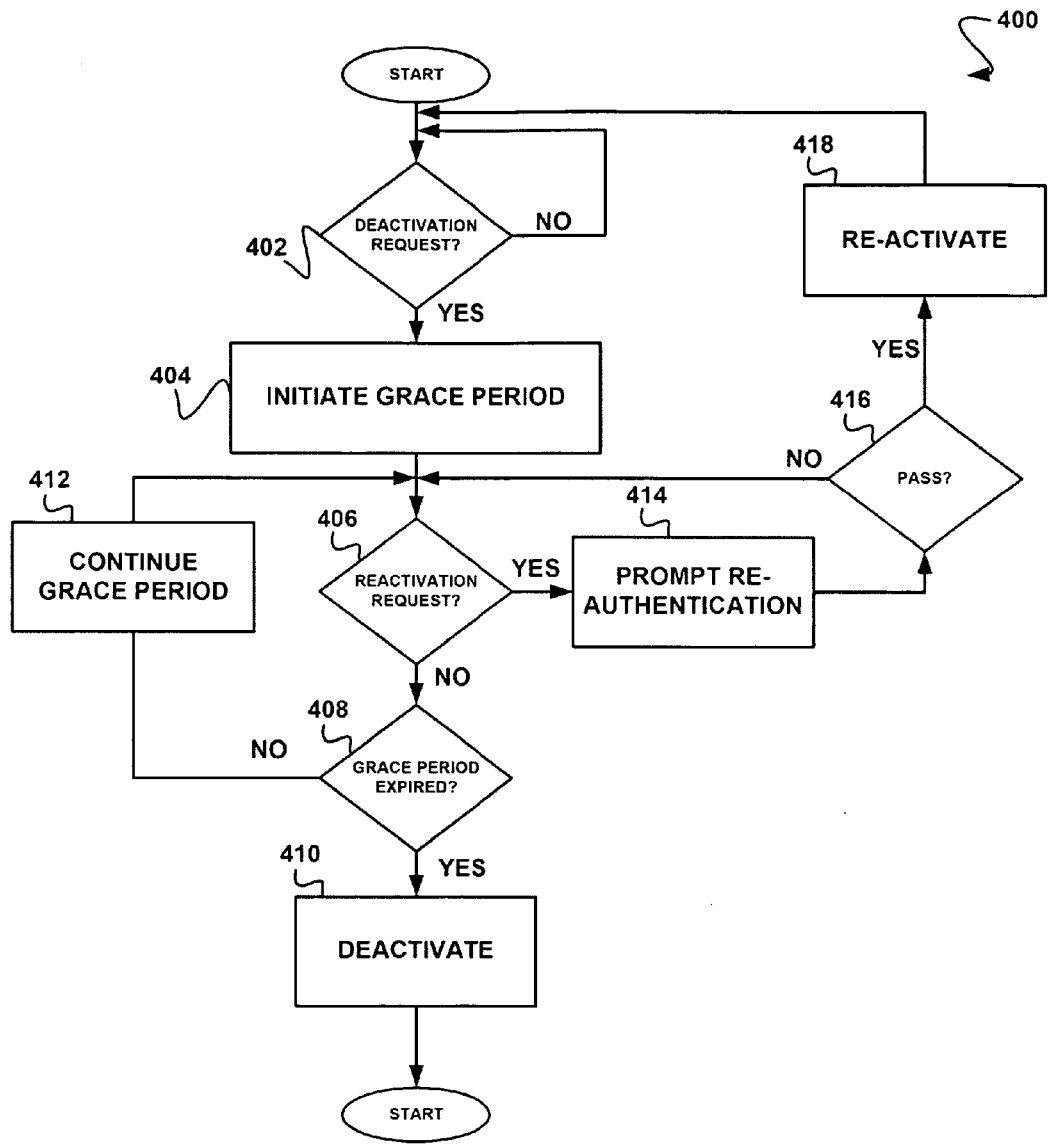
FIG. 4 shows a method for a pre-deactivation grace period, in accordance with another embodiment.

FIG. 4 shows a method 400 for a pre-deactivation grace period, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, it is determined whether a deactivation request is received. See operation 402. In one embodiment, the deactivation request may include a request to deactivate a mobile device. In this case, the deactivation request may include a request to put the mobile device in standby mode, sleep mode, a power-off state, and any other state that is functionally less operational than a current state. Furthermore, the request may correspond to any deactivation event such as a power off event, a standby event, and a reset event, etc.

The deactivation request may be a manual or automatic request. For example, the deactivation request may be a request from a user of the mobile device to power down the device. In another case, the deactivation request may be a request received automatically to put the device in standby mode as a result of an inactive timeout period expiration.

If it is determined that a deactivation request is received, a grace period is initiated. See operation 404. In this case, the grace period refers to a predetermined time period of a delay of the commencement of the deactivation event, in response to the deactivation request.

During the grace period, it is determined whether a reactivation request is received. See operation 406. In this case, the reactivation request may be any request to halt the deactivation or to re-enter a state present when the deactivation request was received.

If it is determined that a reactivation request has not been received, it is determined whether the grace period has expired. See operation 408. If the grace period has expired, the deactivation event is commenced and the mobile device is deactivated. See operation 410.

If the time period has not expired, the grace period is continued until a reactivation request is received or time elapses on the grace period. See operation 412. If it is determined that a reactivation request is received, a prompt for re-authentication is received. See operation 414. In this case, the commencement of the deactivation event is prevented, in response to the reactivation request during the predetermined time period.

It should be noted that the reactivation request may take many forms. In one embodiment, the reactivation request may be a request or attempt to access functionality of the mobile device. For example, if during the grace period a phone call is received on the mobile device, an attempt to answer the call may be considered a reactivation request.

As an option, the mobile device may be configured such that any call received during the grace period qualifies as a reactivation request. In another embodiment, an email or text message may be received during the grace period. In this case, an attempt to read and/or respond to the message may be considered a reactivation request.

In still another embodiment, an icon may be displayed on the mobile device during the grace period. In this case, selection of the icon during the grace period may qualify as a reactivation request. As another option, an incoming message or call may prompt a user initiate reactivation. In this case, acknowledgment of the prompt in the affirmative may qualify as a reactivation request.

In various other embodiments, the reactivation request may include any active request (i.e. user initiated) or passive request (i.e. automatically initiated from an incoming call, message, etc.). Furthermore, it should be noted that partial or all functionality of the mobile device may be available during the grace period. For example, outgoing and/or incoming calling may be available during the grace period. As another option, alerts may be available during the grace period.

In one embodiment, the functionality available during the grace period may be configurable. For example, an administrator may configure the functionality available during the grace period. In this case, an interface may be used to select/deselect the functionality available during the grace period.

With further reference to FIG. 4, once the prompt for re-authentication is received, it is determined whether the re-authentication passes. See operation 416. For example, a user of the mobile device may be prompted for re-authentication on the device by the display of a re-authentication interface. In this case, the re-authentication interface may include a prompt for prompting the user for authentication information.

In one embodiment, the re-authentication interface may be the same as an original authentication interface used to authenticate a user on the mobile device. As an option, the authentication information required for a re-authentication process may be weaker than an original authentication process required during a prior authentication. For example, upon initial authentication to a device, a user may be required to input a more complex password than the password required for a second re-authentication process.

This may be implemented such that the user may quickly authenticate during the re-authentication process to answer a call or respond to an email, etc. Furthermore, because the re-authentication takes place during a predetermined grace period, when security concerns are less than prior to an initial authentication, the password required for the re-authentication may be less complex than the password for the initial authentication. For example, in one embodiment, the initial authentication password may require at least twelve characters including letters and numbers whereas the re-authentication password may only require six characters. Of course, this is only an example, as the initial authentication password and the re-authentication password may include any number of letters and/or numbers. As an option, these password requirements may be configured by an administrator using an interface.

If it is determined that the re-authentication passed, the device is re-activated. See operation 418. In this case, the reactivation may include terminating, the deactivation process and restoring an active state of the device before the deactivation process began. In one embodiment, the active state of the device may be preserved during the grace period. In this case, the re-activation may involve halting the deactivation process.

Figure 5:
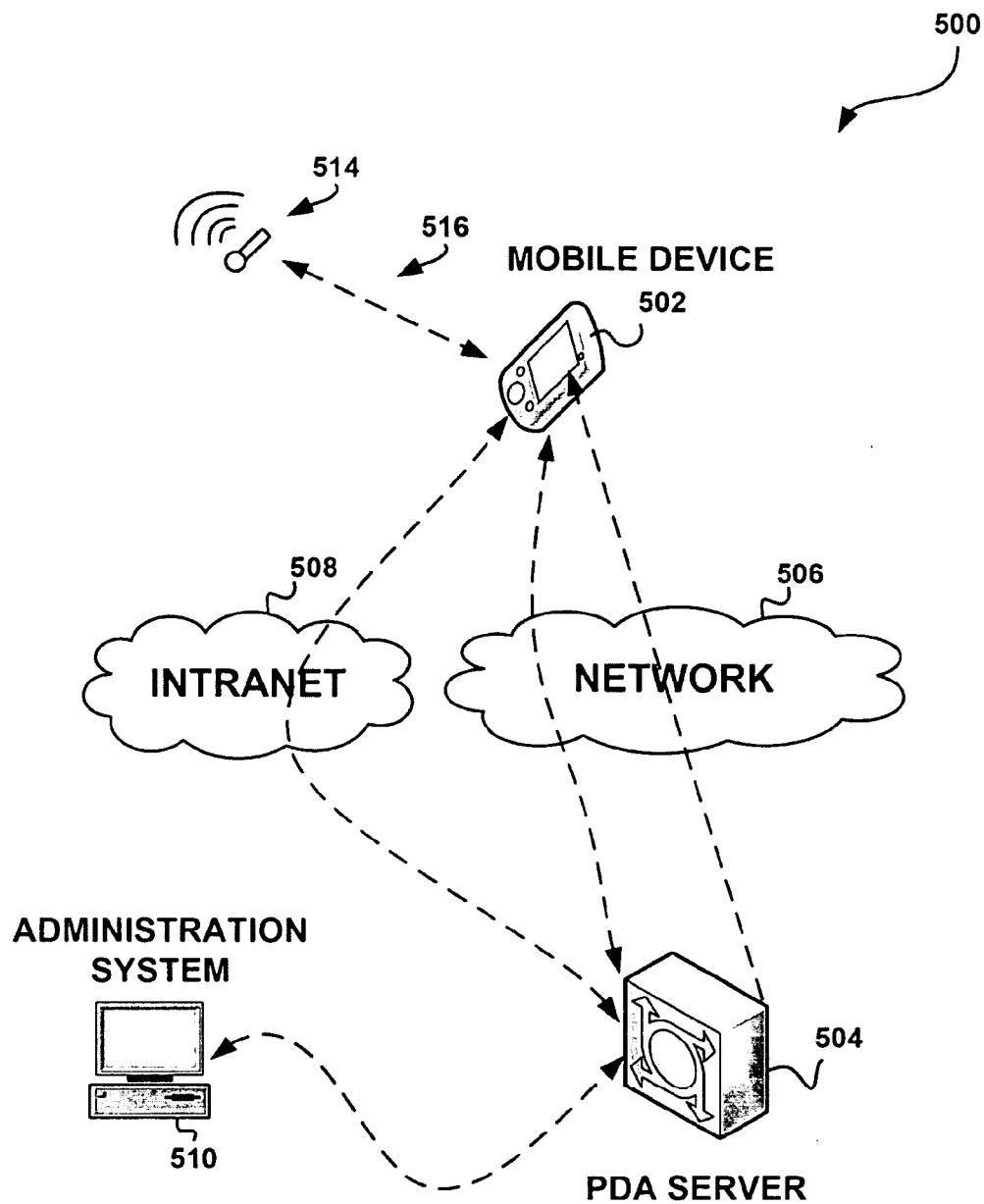
FIG. 5 shows a system for implementing a pre-deactivation grace period, in accordance with another embodiment.

FIG. 5 shows a system 500 for implementing a pre-deactivation grace period, in accordance with another embodiment. As an option, the system 500 may be implemented in the context of the architecture and environment of FIGS. 1-4. Of course, however, the system 500 may be implemented in any desired environment. Again, the aforementioned definitions may apply during the present description.

As shown, a mobile device 502 is in communication with a server 504 over a network 506. As shown further, the mobile device 502 may also be in communication with the server 504 over a network 508. Furthermore, an administration system 510 capable of configuring the server 504 and/or the mobile device 502 is also provided. As an option, the administration system 510 may communicate with the server 504 over a network or a direct link.

In operation, the mobile device 502 may be capable of displaying a pre-authentication interface such that the mobile device 502 permits data entry prior to a user being authenticated on the mobile device 502. As an option, the mobile device 502 may be capable of communicating with and/or using functionality associated with the server 504 through the pre-authentication screen. For example, the mobile device 502 may have the ability to send text messages to certain contacts or numbers via the using the pre-authentication screen.

In one embodiment, the user may be restricted from accessing files stored on the server 504 and/or the mobile device 502 before the user is authenticated on the mobile device 502. For example, the pre-authentication screen may only allow the user access to the server 504 and/or the mobile device 502 for authentication purposes and minimal device functionality. In other words, the user may not have the ability to access the server 504 and/or files on the mobile device 502 using the pre-authentication interface for any other function than authentication and limited calling/messaging (e.g. emergency calling/messaging, etc.).

In another embodiment, the user may have access to only certain content corresponding to the server 504 and/or the mobile device 502 using the pre-authentication interface of the mobile device 502. For example, the user may have access to non-restricted files associated with the server 504 and/or the mobile device 502. As another option, the user may have access to certain applications associated with the server 504 and/or the mobile device 502 using the pre-authentication interface.

Upon authentication, a user may have full access to functionally associated with the mobile device 502, as well as corresponding files and folders. In the case that a deactivation request is detected for a deactivation event, the commencement of the deactivation event may be delayed for a predetermined time period. During this time period, the user may have full or partial access to functionally associated with the mobile device 502 as well as corresponding files and folders, depending on administrative configuration.

In one embodiment, the deactivation event may initiate an encryption process, where files and folders associated with the device 502 are encrypted. As an option, this encryption process may be delayed by the predetermined time period. In this case, the predetermined time period may be a period defined by an administrator using an interface included with the administration system 510.

As shown further in FIG. 5, a Bluetooth device 514 may also be provided, the Bluetooth device being capable of communicating with the mobile device 502 via a communication channel 516. In use, the user may initiate an authentication event on the mobile device 502. In response to the initiation of the authentication event, the communication channel 516 is disabled such that the Bluetooth device 514 is incapable of communication with the mobile device 502 until the authentication event has concluded.

Figure 6:
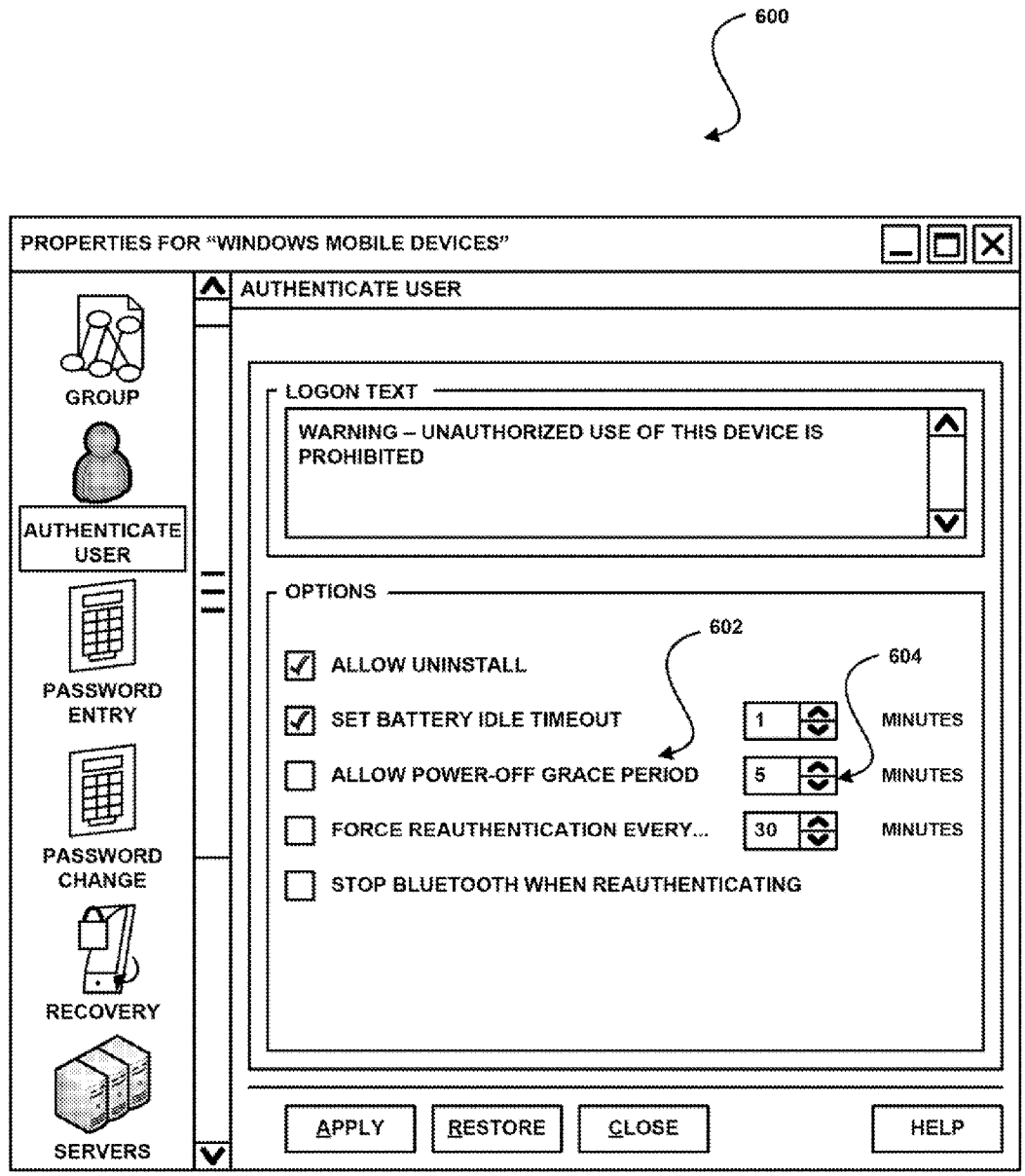
FIG. 6 shows a graphical user interface for configuring a pre-deactivation grace period, in accordance with another embodiment.

FIG. 6 shows a graphical user interface 600 for configuring a pre-deactivation grace period, in accordance with another embodiment. As an option, the interface 600 may be implemented in the context of the architecture and environment of FIGS. 1-5. Of course, however, the interface 600 may be implemented in any desired environment. It should also be noted that the aforementioned definitions may apply during the present description.

As shown, the interface 600 may include a selection box 602 such that a user (e.g. an administrator) may configure a device to allow a deactivation grace period. As shown further, the interface 600 may also allow the user to configure the period of time for the grace period using a text box 604. In this way, the predetermined time period of the grace period may be configured utilizing the interface 600.

In various embodiments, the text box 604 may provide the user with the option to select from a plurality of predetermined times and/or enter a user defined predetermined time. For example, the text box 604 may provide the user with the option to select from a range of times from 30 seconds to 30 minutes. In addition, the text box 604 may allow the user to manually enter any desired number.

Figure 7:
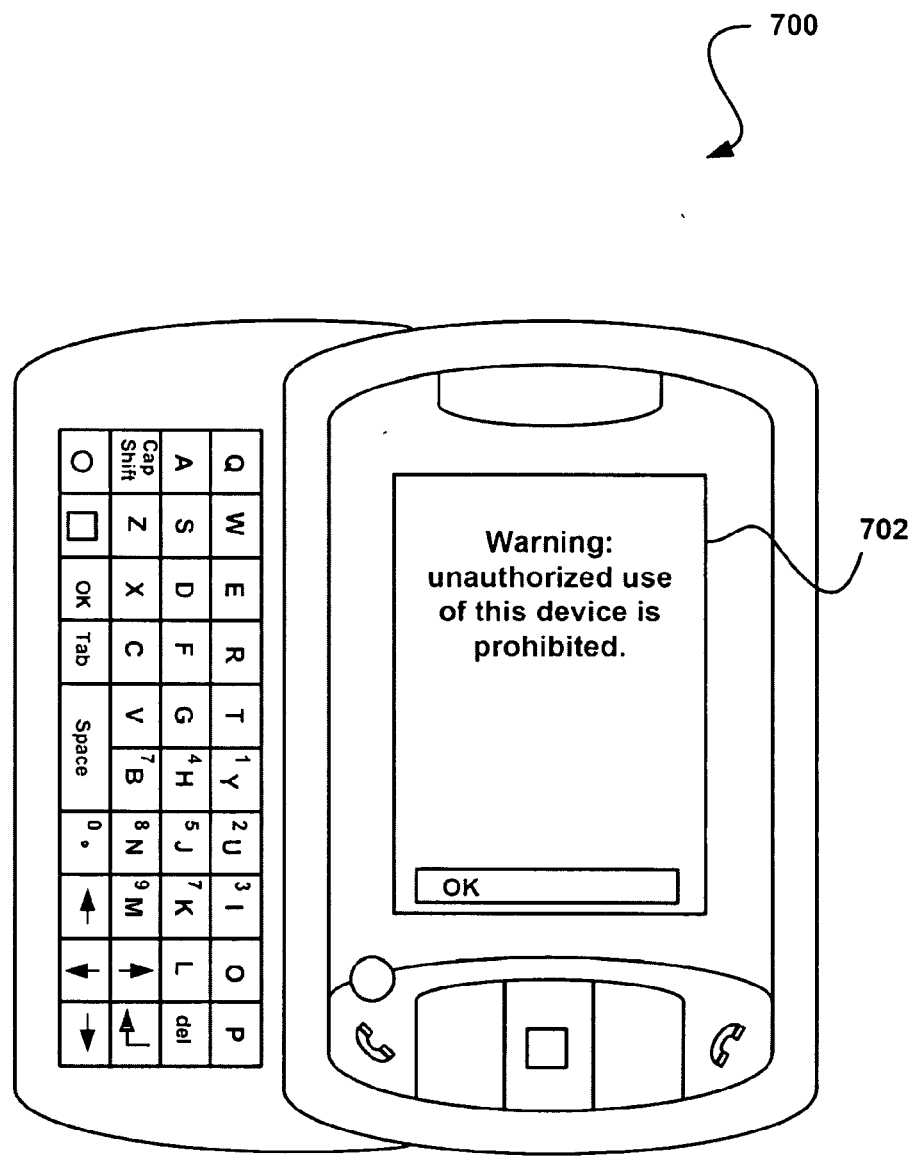
FIG. 7 shows a mobile device including a pre-authentication interface for permitting data entry, in accordance with another embodiment.

FIG. 7 shows a mobile device 700 including a pre-authentication interface 702 for permitting data entry, in accordance with another embodiment. As an option, the mobile device 700 may be implemented in the context of the architecture and environment of FIGS. 1-6. Of course, the mobile device 700 may be implemented in any desired environment. Further, the aforementioned definitions may apply during the present description.

As an option, the mobile device 700 may include a client application which allows administrators to secure a mobile device population of an organization (e.g. PDAs, Smartphones, etc.). In particular, the client application may allow the protection of sensitive information stored on the device 700. In one embodiment, the client application may protect mobile devices running Windows Mobile software.

In operation, the client application may encrypt files, folders and databases such that they cannot be accessed unless a user of the device 700 can authenticate properly with a password. The encryption/decryption process may be carried out transparently to the end user and will not affect the normal operation of the mobile device 700 after the user has logged on.

As shown, configurable warning/informational text may be displayed using the pre-authentication interface 702. As an option, the warning/informational text may be defined by an administrator. In this case, the warning/informational text may be configured on a server that is in communication with the mobile device 700. Using this server, a plurality of mobile devices may be synchronized such that the same warning/informational text may be displayed on the plurality of mobile devices.

As an option, the warning/informational text may always be displayed on the pre-authentication interface 702 prior to logging on to the mobile device 700. In the case that no warning/informational text has been configured and/or defined, default text or an authentication screen may be displayed on the pre-authentication interface 702.

In one embodiment, the pre-authentication interface 702 may be displayed during a grace period of a deactivation process. In this case, an indicator indicating that the deactivation process is occurring may also be displayed. Additionally, an icon to skip the grace period and/or terminate the deactivation process (i.e. reactivate) may also be displayed.

Figure 8:
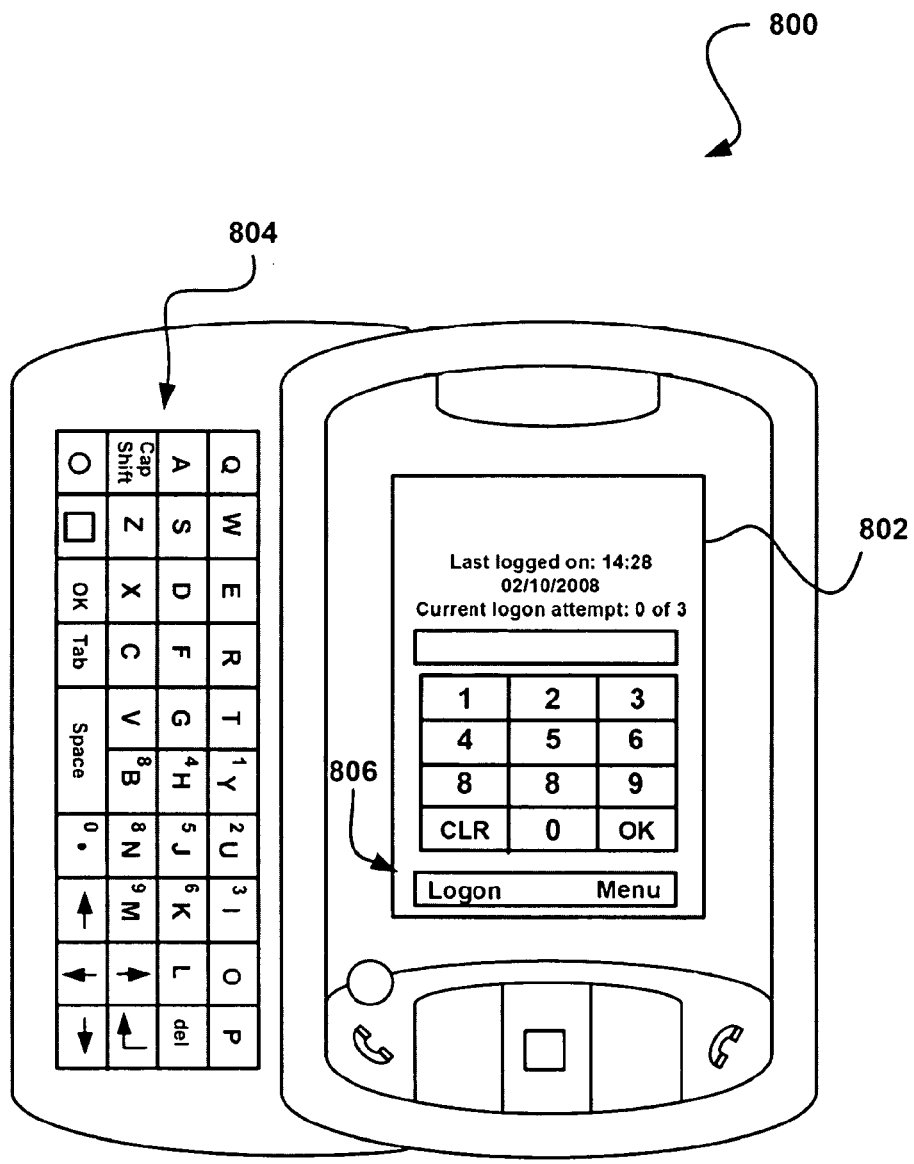
FIG. 8 shows a mobile device including an authentication interface, in accordance with another embodiment.

FIG. 8 shows a mobile device 800 including an authentication interface 802, in accordance with another embodiment. As an option, the mobile device 800 may be implemented in the context of the architecture and environment of FIGS. 1-7. Of course, the mobile device 800 may be implemented in any desired environment. It should also be noted that the aforementioned definitions may apply during the present description.

As shown, the authentication interface 802 may provide information associated with the last time the mobile device 800 was successfully logged on, as well as information about failed login attempts. As an option, such as on smaller display screens, the mobile device 800 may automatically cycle between the information showing the last logon and the information about failed login attempts. As shown further, the authentication interface 802 may be configured to display a PIN pad or an on-screen keyboard. Using the PIN pad, the on-screen keyboard, or a keyboard 804 corresponding to the mobile device 800, a user may enter a password and press a logon button 806 in order to authenticate on the device 800. As an option, the authentication interface 802 may further include configurable warning/informational text.

In one embodiment, the authentication interface 802 may be utilized as a re-authentication interface. For example, upon receiving a reactivation request during a deactivation grace period, the authentication interface 802 may be displayed. In this case, the authentication interface 802 may include a notification that re-authentication is occurring as opposed to initial authentication and that a re-authentication password should be used as opposed to an initial authentication password. In another embodiment, the initial authentication password and the re-authentication password may be the same.

Figure 9:
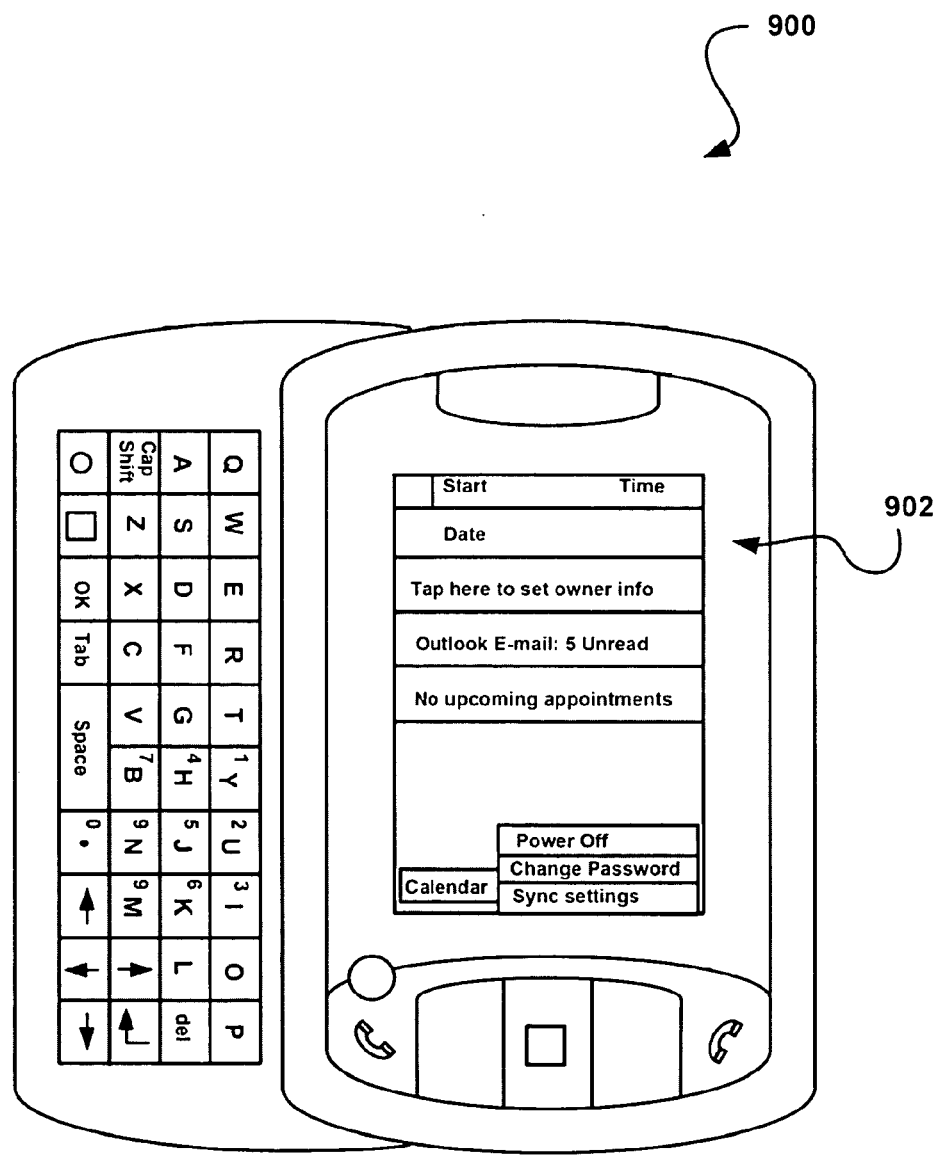
FIG. 9 shows a mobile device including a post-authentication interface provided after authentication of a user, in accordance with another embodiment.

FIG. 9 shows a mobile device 900 including a post-authentication interface 902 provided after authentication of a user, in accordance with another embodiment. As an option, the mobile device 900 may be implemented in the context of the architecture and environment of FIGS. 1-8. Of course, however, the mobile device 900 may be implemented in any desired environment. Again, the aforementioned definitions may apply during the present description.

As shown, the post-authentication interface 902 may provide access to various files, folders, and applications on the mobile device 900. As noted above, an application included on the mobile device 900 may have encrypted one or more files and folders on the mobile device 900. This prevents anyone other than an authorized user from accessing a calendar, tasks, email messages, etc. stored on or accessed by the mobile device 900.

Once authenticated on the mobile device 900, the post-authentication interface 902 may allow the use and access of this functionality and access to the files and folders inaccessible from a pre-authentication interface. In this way, the pre-authentication interface may be utilized for data entry and performing basic functionality using the mobile device 900, while limiting access to restricted data or certain functionality associated with the mobile device 900. On the other hand, the post-authentication interface 902 may allow an authenticated user to access all files, folders, and applications associated with the mobile device 900.

Figure 10:
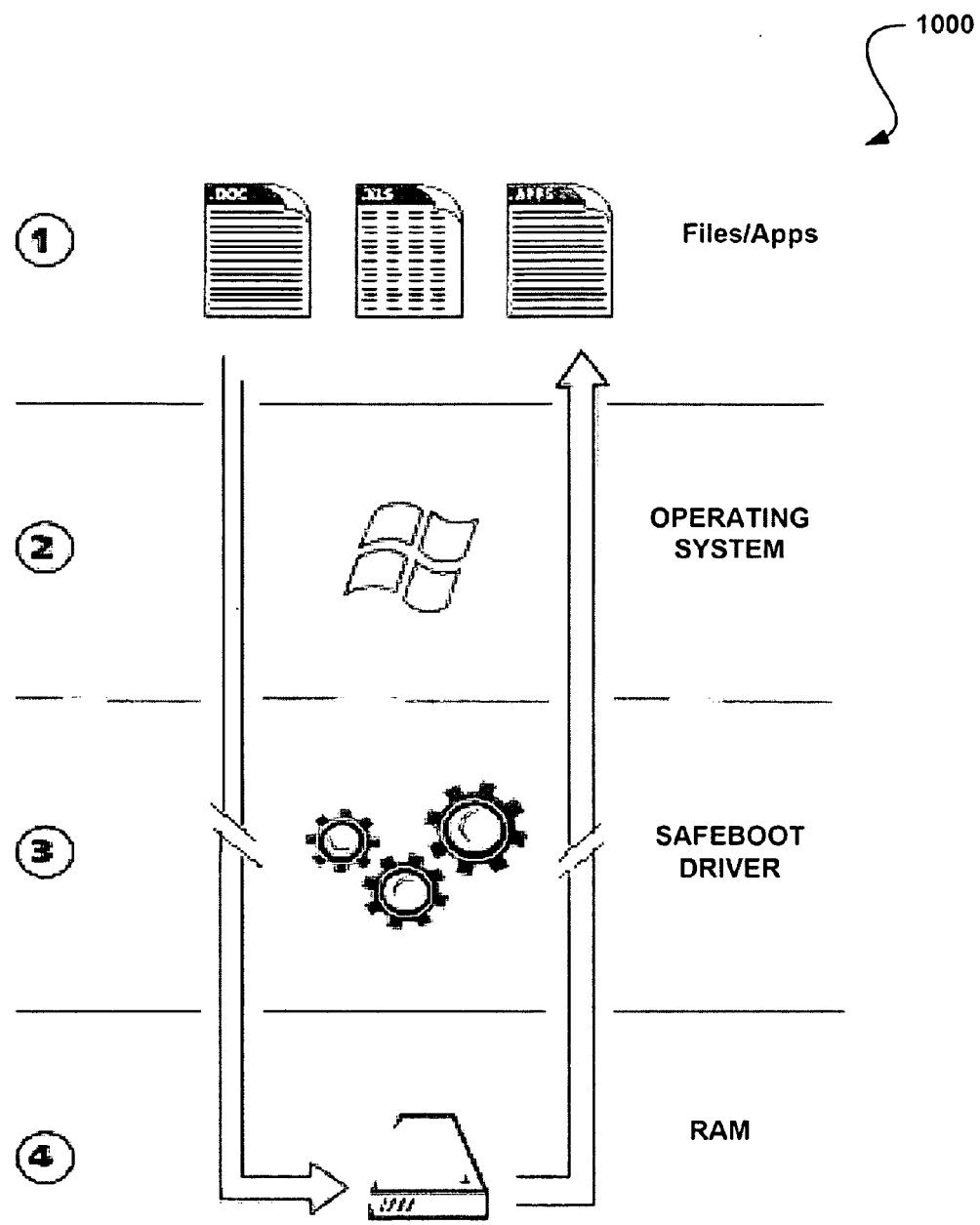
FIG. 10 shows a method for encrypting/decrypting files, in accordance with another embodiment.

FIG. 10 shows a method 1000 for encrypting/decrypting files, in accordance with another embodiment. As an option, the method 1000 may be implemented in the context of the architecture and environment of FIGS. 1-9. Of course, however, the method 1000 may be carried out in any desired environment. It should also be noted that the aforementioned definitions may apply during the present description.

As shown, when a user has been authenticated on a mobile device, files are in plain text and fully viewable by the authorized user(s) and applications(s). For encryption purposes, the files are translated into sectors and the sectors are encrypted in memory. The sectors may then be stored in non-volatile RAM (random access memory) of the mobile device.

In various embodiments, the encryption may occur on power down of the device, a logout, a mode change, a time out, or any other event where encryption may be desired. Using this encryption, non-authorized users may be restricted from access to files. Thus, a user may be required to enter authentication information on an authentication screen to decrypt the files.

Upon authentication, the sectors are read from the non-volatile RAM of the mobile device. The encrypted sectors may then be decrypted in memory and assembled into files. Upon assembly, the files may once again be fully viewable by the authorized user(s) and applications(s).

In one embodiment, the encryption may include a fully transparent Advanced Encryption Standard (AES) Federal Information Processing Standards (FIPS) 256 bit encryption. In various embodiments, the encryption may include encrypting specified files/folders, e-mails, encryption of standard application databases such as contacts, calendars, speed dials, appointments, tasks, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium having executable instructions stored thereon for causing a mobile device to:
   receive first authentication information allowing user to logon to the mobile device and access full user level functionality;
   detect a deactivation request;
   initiate a deactivation grace period in response to the deactivation request;

detect a reactivation request before the deactivation grace period expires;

display, during the deactivation grace period and in response to the reactivation request, a prompt for authentication information wherein the prompt includes information identifying a last time the mobile device was successfully logged on using the first authentication information;

receive second authentication information in response to the prompt; and commence deactivation of the mobile device if the prompt for authentication information is not successfully responded to before the deactivation grace period expires, wherein at least partial functionality representing a subset of the full user level functionality is available during the deactivation grace period.

2. The non-transitory computer readable medium of claim wherein the deactivation request includes a user request.

3. The non-transitory computer readable medium of claim 1, wherein the deactivation includes at least one of a power off event, a standby event, and a reset event.

4. The non-transitory computer readable medium of claim 1, wherein full user level functionality of the mobile device is available during the deactivation grace period.

5. The non-transitory computer readable medium of claim 1 wherein duration of the deactivation grace period is configurable.

6. The non-transitory computer readable medium of claim 5, wherein the duration of the deactivation grace period is configurable utilizing a graphical user interface.

7. The non-transitory computer readable medium of claim 1, wherein the second authentication information to authenticate during the deactivation grace period is weaker than the first authentication information required during a prior authentication before entering the deactivation grace period.

8. The non-transitory computer readable medium of claim 1, further comprising executable instructions to encrypt memory on the mobile device during deactivation of the mobile device.

9. The non-transitory computer readable medium of claim 1, wherein the executable instructions to detect a deactivation request comprise executable instructions to detect a deactivation request originating at a location other than the mobile device.

10. The non-transitory computer readable medium of claim 1, wherein the executable instructions to display a prompt for authentication information further comprise executable instructions to display information identifying a number of failed attempts to respond to the prompt for authentication information.

11. The non-transitory computer readable medium of claim 1, wherein the executable instructions to initiate a deactivation grace period comprise executable instructions to initiate a deactivation grace period having a predetermined duration.

12. The non-transitory computer readable medium of claim 1, wherein the executable instructions to detect a reactivation request comprise executable instructions to detect an attempt to access functionality of the mobile device during the deactivation grace period.

13. The non-transitory computer readable medium of claim 1, wherein the executable instructions to detect a reactivation request comprise executable instructions to detect a signal received by the mobile device.

14. The non-transitory computer readable medium of claim 1, wherein the executable instructions to display the prompt further include executable instructions to display informational text as part of the prompt, wherein the informational text was received from a server by the mobile device.

15. The non-transitory computer readable medium of claim 1, wherein the executable instructions to display the prompt further include executable instructions to automatically cycle through multiple informational messages on a screen of the mobile device.

16. A method, comprising:

receiving first authentication information allowing a user to logon to a mobile device and access full user level functionality;

detecting, on the mobile device, a deactivation request;

initiating, on the mobile device, a deactivation grace period in response to the deactivation request;

detecting, on the mobile device, a reactivation request before the deactivation grace period expires;

displaying, on the mobile device, a prompt for second authentication information during the deactivation grace period and in response to the reactivation request wherein the prompt includes information containing a last time the mobile device was successfully logged on using the first authentication information;

receive second authentication information in response to the prompt, wherein the second authentication information is different than the first authentication information; and commencing deactivation of the mobile device if the prompt for authentication information is not successfully responded to before the deactivation grace period expires, wherein at least partial functionality representing a subset of the full user level functionality is available during the deactivation grace period.

17. The non-transitory computer readable medium of claim 1, wherein the executable instructions to detect a deactivation request comprise executable instructions to detect a mobile device generated deactivation request.

18. The method of claim 16, wherein duration of the deactivation grace period is user configurable.

19. The method of claim 16, further comprising encrypting memory on the mobile device during deactivation of the mobile device.

20. The method of claim 16, wherein the act of displaying a prompt for authentication information comprises displaying the prompt for authentication information further comprising displaying information containing a number of failed attempts to respond to the prompt for authentication information.

21. The method of claim 16, further comprising:

receiving informational text from a server communicatively coupled to the mobile device; and including the informational text with the prompt for authentication information.

22. The method of claim 16, further comprising:

automatically cycling through multiple informational messages on a screen of the mobile device when displaying the prompt.

* * * * *

UNITED STATES PATENT AND TRADEMARK OFFICE
CERTIFICATE OF CORRECTION

PATENT NO. : 8,555,336 B1
APPLICATION NO. : 12/056907
DATED : October 8, 2013
INVENTOR(S) : Rajkaran Singh Dhesi et al.

It is certified that error appears in the above-identified patent and that said Letters Patent is hereby corrected as shown below:

In the Claims

In column 8, line 62, in claim 1, after "allowing" insert -- a --.

In column 9, line 19, in claim 2, delete "claim" and insert -- claim 1, --, therefor.

In column 9, line 27-28, in claim 5, delete "claim 1" and insert -- claim 1, --, therefor.

Signed and Sealed this
Eighteenth Day of February, 2014

Michelle K. Lee
*Deputy Director of the United States Patent and Trademark Office*